United States Patent
Girija et al.

(10) Patent No.: US 10,225,182 B2
(45) Date of Patent: Mar. 5, 2019

(54) APPARATUS, SYSTEM, AND METHOD FOR FACILITATING LABEL-IDENTIFIED ROUTING DECISIONS BY IBGP PEERS

(71) Applicant: Juniper Networks, Inc., Sunnyvale, CA (US)

(72) Inventors: Ratheesh Kumar Radhakrishnan Girija, Fremont, CA (US); Vijesh Chandran, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 54 days.

(21) Appl. No.: 15/445,455

(22) Filed: Feb. 28, 2017

(65) Prior Publication Data
US 2018/0248793 A1    Aug. 30, 2018

(51) Int. Cl.
| | |
|---|---|
| *H04L 12/723* | (2013.01) |
| *H04L 12/781* | (2013.01) |
| *H04L 12/721* | (2013.01) |
| *H04L 12/715* | (2013.01) |
| *H04L 12/741* | (2013.01) |
| *H04L 29/12* | (2006.01) |
| *H04L 29/06* | (2006.01) |

(52) U.S. Cl.
CPC .............. *H04L 45/50* (2013.01); *H04L 45/04* (2013.01); *H04L 45/507* (2013.01); *H04L 45/52* (2013.01); *H04L 45/66* (2013.01); *H04L 45/745* (2013.01); *H04L 61/103* (2013.01); *H04L 69/26* (2013.01); *H04L 45/54* (2013.01); *H04L 45/70* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 6,526,056 B1 | 2/2003 | Rekhter et al. | |
| 8,953,446 B1 * | 2/2015 | Wang .................. | H04L 12/4641 370/231 |
| 2004/0039839 A1 * | 2/2004 | Kalyanaraman ........ | H04L 45/00 709/238 |

(Continued)

OTHER PUBLICATIONS

Rosen Cisco Systems, et al.; BGP/MPLS IP Virtual Private Networks (VPNs); IETF; ISOC, Geneva Switzerland; Feb. 1, 2006.

(Continued)

*Primary Examiner* — Afsar M Qureshi
(74) *Attorney, Agent, or Firm* — FisherBroyles, LLP

(57) ABSTRACT

The disclosed computer-implemented method may include (1) identifying a plurality of routes that lead to a plurality of eBGP peers that represent portions of network paths, (2) assigning a plurality of labels to the routes that lead to the eBGP peers, (3) advertising the labels to an iBGP peer to enable the iBGP peer to make routing decisions identified by the labels, (4) receiving, from the iBGP peer, traffic that is destined for an endpoint device and includes a label that (A) was selected by the iBGP peer and (B) corresponds to a specific route that leads to a specific eBGP peer, and then (5) forwarding the traffic to the endpoint device along the specific route that leads to the specific eBGP peer based at least in part on the label selected by the iBGP peer. Various other methods, systems, and apparatuses are also disclosed.

18 Claims, 5 Drawing Sheets

(56) References Cited

U.S. PATENT DOCUMENTS

| | | | |
|---|---|---|---|
| 2006/0233181 A1* | 10/2006 | Raszuk | H04L 45/02 370/401 |
| 2010/0177752 A1* | 7/2010 | Aggarwal | H04L 45/50 370/338 |
| 2011/0142053 A1* | 6/2011 | Van Der Merwe | H04L 47/72 370/395.1 |
| 2011/0274111 A1* | 11/2011 | Narasappa | H04L 12/4633 370/392 |
| 2011/0286452 A1 | 11/2011 | Balus et al. | |
| 2013/0031271 A1 | 1/2013 | Bosch et al. | |
| 2017/0310589 A1* | 10/2017 | Tambakuwala | H04L 45/023 |

OTHER PUBLICATIONS

Gredler et al.; "Egress Peer Engineering Using BGP-LU;" IETF; ISOC, Geneva Switzerland; Dec. 6, 2016.

\* cited by examiner

APPARATUS, SYSTEM, AND METHOD FOR FACILITATING LABEL-IDENTIFIED ROUTING DECISIONS BY IBGP PEERS

BACKGROUND

Networks often include various devices that facilitate the flow of traffic between source and destination. For example, a network may include a Customer Edge (CE) router that interfaces with a Provider Edge (PE) router. In this example, traffic coming from the CE router may travel to the PE router on the way to its final destination.

In some traditional configurations, while the PE router may support MultiProtocol Label Switching (MPLS), the CE router may provide no such support. Instead, the CE router may simply rely on Internet Protocol (IP) routing to direct the traffic to the PE router. As a result, upon receiving the traffic, the PE router may need to perform an IP lookup to continue forwarding the traffic toward its final destination. Unfortunately, this IP lookup may take more time and/or consume more computing resources than an MPLS label lookup, thereby potentially impairing the PE router's performance in a relative way.

Moreover, in some scenarios, it may be desirable to allow the CE router to make upstream routing decisions for the traffic. Unfortunately, because the CE router relies on IP routing as opposed to MPLS, the CE router may have no control and/or influence over the routing decisions made upstream by the PE router. The instant disclosure, therefore, identifies and addresses a need for apparatuses, systems, and methods for facilitating label-based routing decisions by CE routers.

SUMMARY

As will be described in greater detail below, the instant disclosure generally relates to apparatuses, systems, and methods for facilitating label-based routing decisions by internal Border Gateway Protocol (iBGP) routers. In one example, a computer-implemented method for facilitating label-based routing decisions by iBGP routers may include (1) identifying a plurality of routes that lead to a plurality of external Border Gateway Protocol (eBGP) peers that represent portions of network paths, (2) assigning a plurality of labels to the routes that lead to the eBGP peers, (3) advertising the labels to an iBGP peer to enable the iBGP peer to make routing decisions identified by the labels, (4) receiving, from the iBGP peer, traffic that is destined for an endpoint device and includes a label that (A) was selected by the iBGP peer and (B) corresponds to a specific route that leads to a specific eBGP peer, and then (5) forwarding the traffic to the endpoint device along the specific route that leads to the specific eBGP peer based at least in part on the label selected by the iBGP peer.

As another example, a system for implementing the above-described method may include various modules stored in memory. The system may also include at least one physical processor that executes these modules. For example, the system may include (1) a route module that identifies a plurality of routes that lead to a plurality of eBGP peers that represent portions of network paths, (2) an assignment module that assigns a plurality of labels to the routes that lead to the eBGP peers, (3) an advertising module that advertises the labels to an iBGP peer to enable the iBGP peer to make routing decisions identified by the labels, (4) a receiving module that receives, from the iBGP peer, traffic that is destined for an endpoint device and includes a label that (A) was selected by the iBGP peer and (B) corresponds to a specific route that leads to a specific eBGP peer, and (5) a forwarding module that forwards the traffic to the endpoint device along the specific route that leads to the specific eBGP peer based at least in part on the label selected by the iBGP peer.

As a further example, an apparatus for implementing the above-described method may include (1) at least one storage device that stores a plurality of routes that lead to a plurality of eBGP peers that represent portions of network paths and (2) at least one physical processing device communicatively coupled to the storage device, wherein the physical processing device (A) assigns a plurality of labels to the routes that lead to the eBGP peers, (B) advertises the labels to an iBGP peer to enable the iBGP peer to make routing decisions identified by the labels, (C) receives, from the iBGP peer, traffic that is destined for an endpoint device and includes a label that (I) was selected by the iBGP peer and (II) corresponds to a specific route that leads to a specific eBGP peer, and (D) forwards the traffic to the endpoint device along the specific route that leads to the specific eBGP peer based at least in part on the label selected by the iBGP peer.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
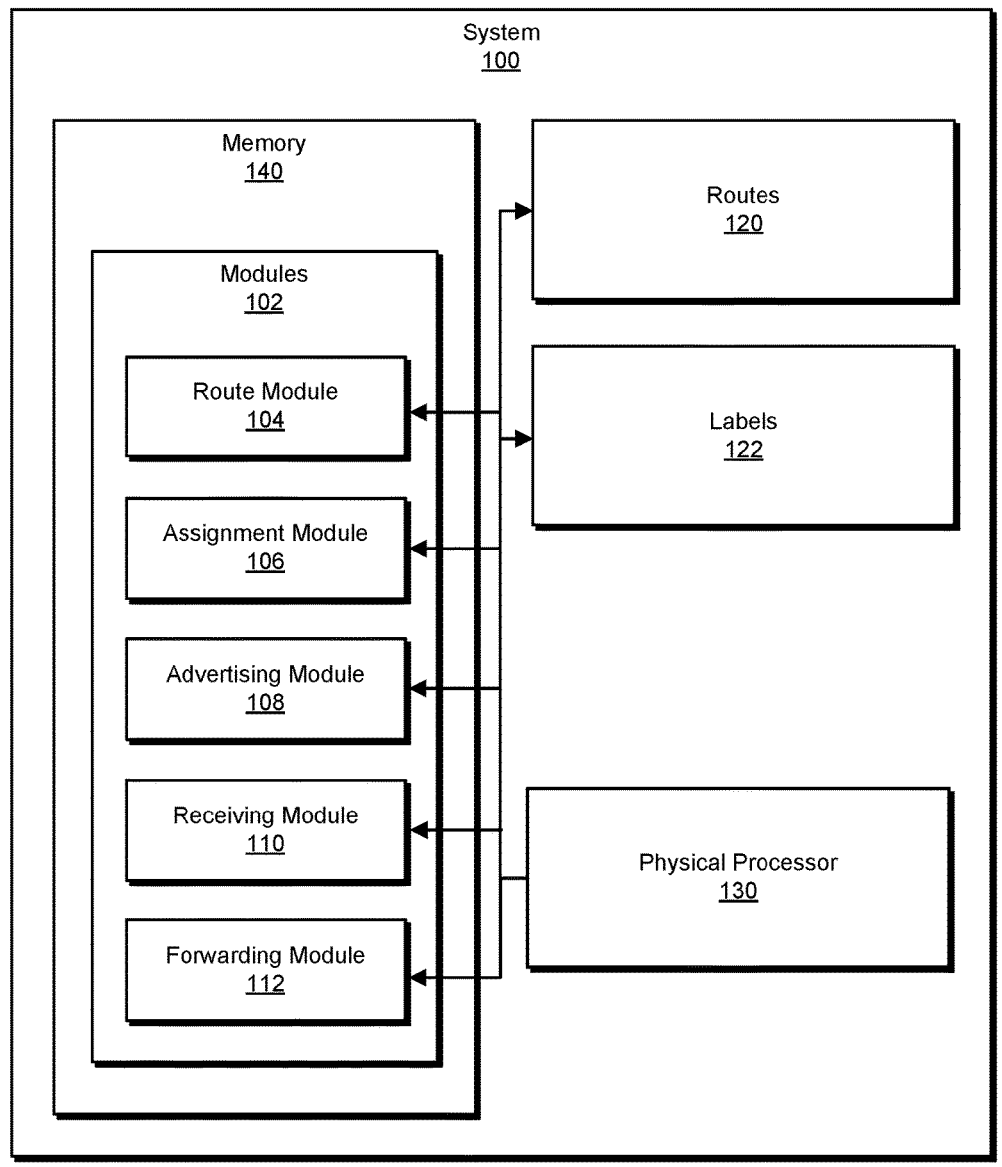
FIG. 1 is a block diagram of an exemplary system for facilitating label-identified routing decisions by iBGP peers.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for facilitating label-identified routing decisions by iBGP peers. As will be explained in greater detail below, a PE router may reside between an iBGP peer and a set of eBGP peers. In this example, the PE router may generate Address Resolution Protocol (ARP) routes that associate the IP addresses of the eBGP peers with their corresponding Media Access Control (MAC) addresses. The PE router may also assign MPLS labels to the ARP routes and then leak the ARP routes and/or MPLS labels by populating a routing table within a Virtual Routing and Forwarding (VRF) instance with the ARP routes and/or the MPLS labels.

Continuing with this example, since the iBGP peer now has access to the ARP routes and/or the MPLS labels, the iBGP peer may be able to make upstream routing decisions for outgoing traffic. For example, the iBGP peer may identify and/or select an eBGP peer that is to receive certain traffic from the PE router. Upon making this selection, the iBGP peer may apply the MPLS label of the selected eBGP peer to the traffic prior to forwarding the same to the PE router. The PE router may receive the labelled traffic from the iBGP peer, perform an MPLS label lookup and swap, and then forward the traffic to the selected eBGP peer based at least in part on the MPLS label applied to the traffic by the iBGP peer.

In doing so, the PE router may avoid the need to perform an IP lookup to forward the traffic to its final destination. As a result, the PE router may save time and/or computing resources when compared to some traditional configurations and/or techniques for forwarding traffic within a BGP network, thereby potentially improving the PE router's performance.

Figure 2:
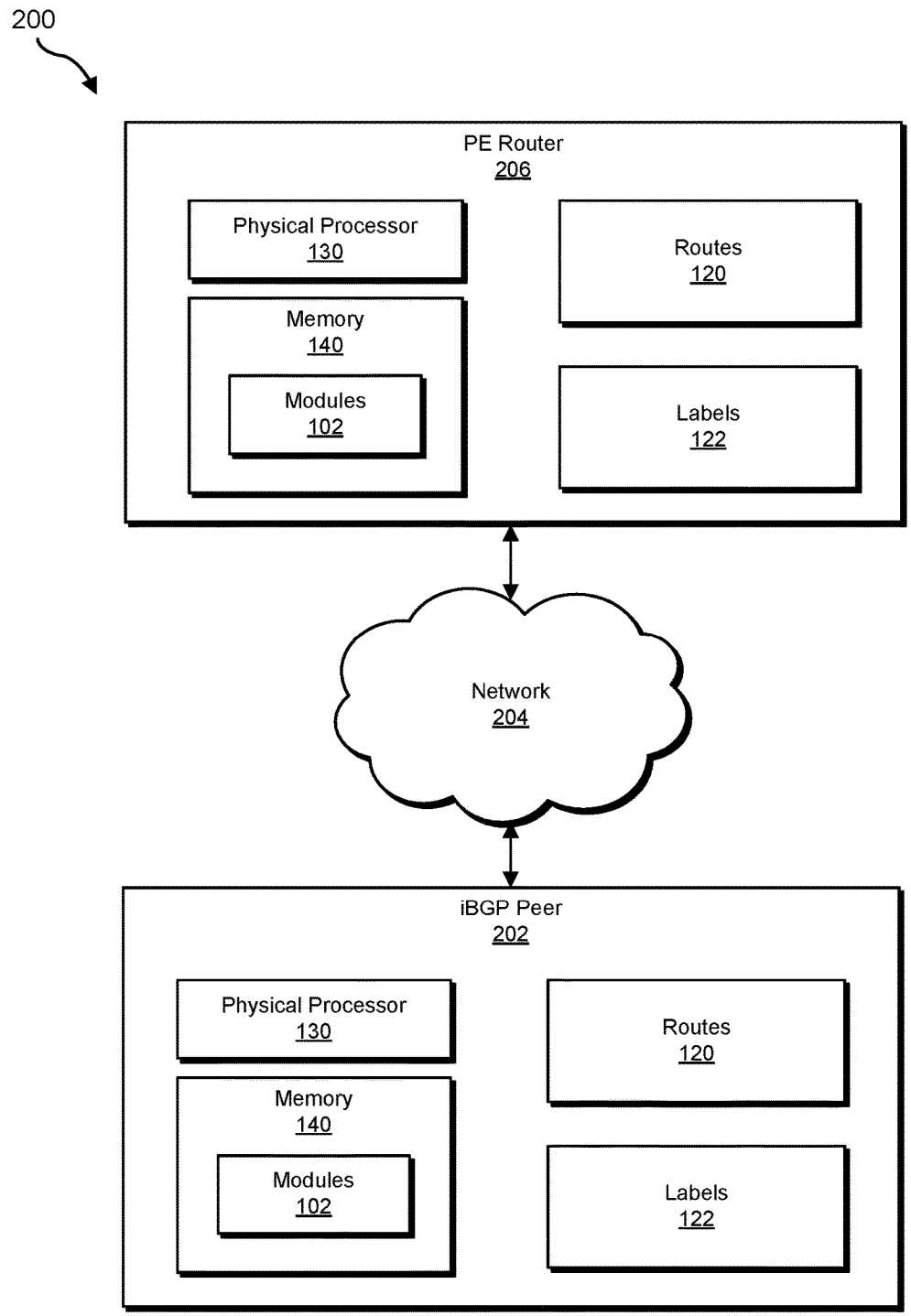
FIG. 2 is a block diagram of an additional exemplary system for facilitating label-identified routing decisions by iBGP peers.
Figure 3:
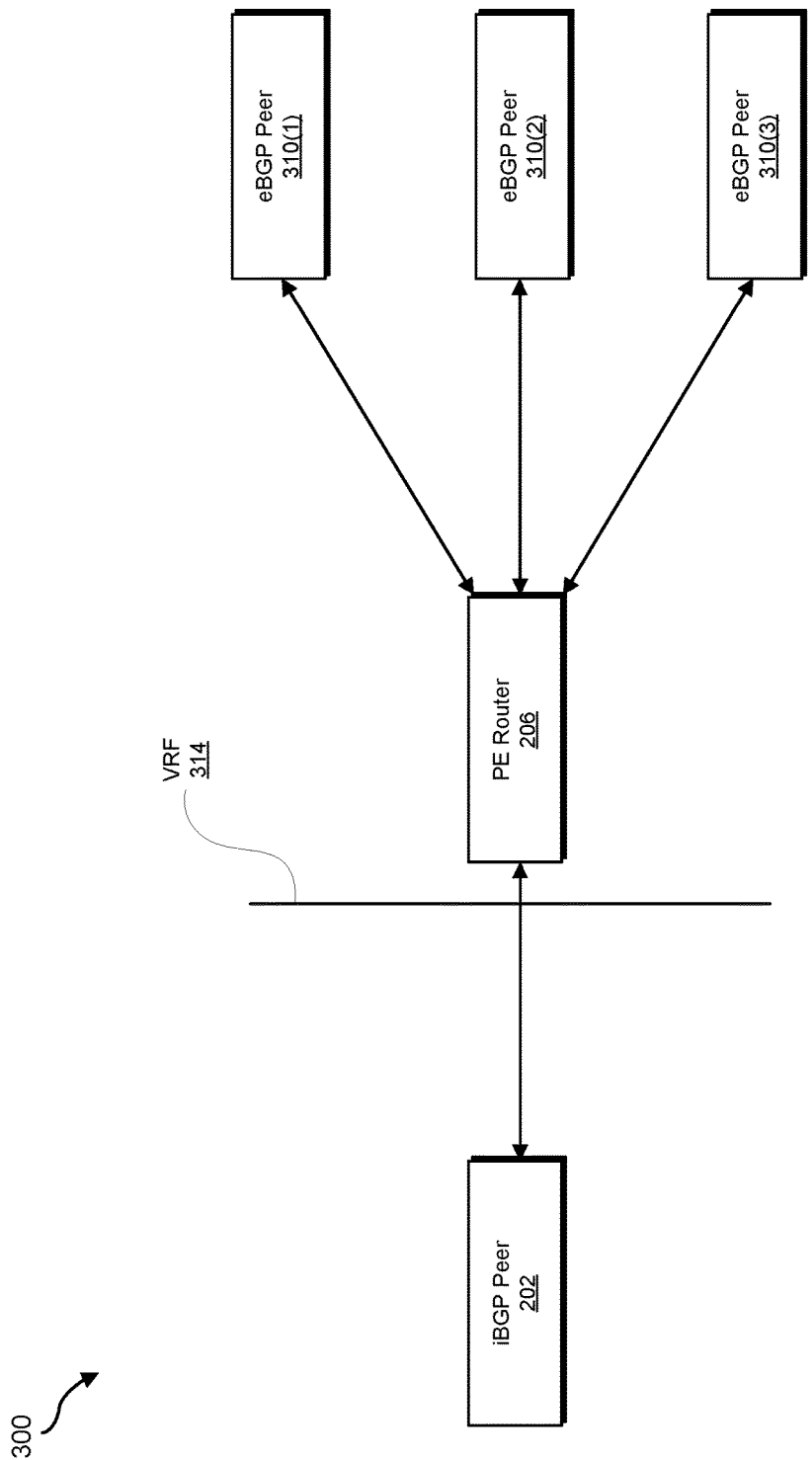
FIG. 3 is a block diagram of an additional exemplary system for facilitating label-identified routing decisions by iBGP peers.

The following will provide, with reference to FIGS. 1-3, detailed descriptions of exemplary systems for facilitating label-identified routing decisions by iBGP peers. Detailed descriptions of corresponding computer-implemented methods will be provided in connection with FIG. 4. In addition, detailed descriptions of an exemplary computing system for carrying out these methods will be provided in connection with FIG. 5.

FIG. 1 is a block diagram of an exemplary system 100 for facilitating label-identified routing decisions by iBGP peers. As illustrated in this figure, exemplary system 100 may include one or more modules 102 for performing one or more tasks. As will be explained in greater detail below, modules 102 may include a route module 104, an assignment module 106, an advertising module 108, a receiving module 110, and a forwarding module 112. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., iBGP peer 202 and/or PE router 206). One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate label-identified routing decisions by iBGP peers. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include one or more routes, such as routes 120. In some examples, routes 120 may each identify at least a portion of a particular path (e.g., a label-switched path) within a network. In such examples, routes 120 may facilitate the flow of traffic within the network. Examples of routes 120 include, without limitation, ARP routes, prefixes, IP routes, IP addresses, MAC addresses, variations or combinations of one or more of the same, and/or any other suitable routes.

Exemplary system 100 may further include one or more labels, such as labels 122. In some examples, labels 122 may include and/or represent MPLS labels. In such examples, labels 122 may be assigned and/or attached to traffic and/or individual packets. Labels 122 may indicate and/or correspond to at least a portion of a particular path within a network. Accordingly, routing and/or forwarding decisions may be determined and/or controlled by the particular label assigned to a packet. For example, a router may receive a packet, identify the label assigned to the packet, and then forward the packet to the next hop corresponding to that particular label.

Exemplary system 100 in FIG. 1 may be implemented in a variety of ways. For example, all or a portion of exemplary system 100 may represent portions of exemplary system 200 in FIG. 2. As shown in FIG. 2, system 200 may include an iBGP peer 202 in communication with a PE router 206 via a network 204. In one example, all or a portion of the functionality of modules 102 may be performed by iBGP peer 202, PE router 206, and/or any other suitable computing system. As will be described in greater detail below, one or more of modules 102 from FIG. 1 may, when executed by at least one processor of iBGP peer 202 and/or PE router 206, enable iBGP peer 202 and/or PE router 206 to facilitate label-identified routing decisions by iBGP peer 202.

iBGP peer 202 generally represents any type or form of physical computing device that supports BGP and facilitates communication within a network. In one example, iBGP peer 202 may include and/or represent a Customer Edge (CE) router that sits at the edge of a customer network and/or interfaces with PE router 206. Alternatively, iBGP peer 202 may include and/or represent another type of router (such as a hub router, a spoke router, an autonomous system boundary router, and/or an area border router). Additional examples of iBGP peer 202 include, without limitation, switches, hubs, modems, bridges, repeaters, gateways, multiplexers, network adapters, network interfaces, servers, portions of one or more of the same, combinations or variations of one or more of the same, and/or any other suitable iBGP peer.

Network 204 generally represents any medium or architecture capable of facilitating communication or data transfer. In one example, network 204 may facilitate communication between iBGP peer 202 and PE router 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), an MPLS network, portions of one or more of the same, variations or combinations of one or more of the same, and/or any other suitable network. Although illustrated as being external to network 204 in FIG. 2, iBGP peer 202 and PE router 206 may each represent a portion of network 204 and/or be included in network 204.

As another example, all or a portion of exemplary system 100 may represent portions of exemplary system 300 in FIG. 3. As shown in FIG. 3, system 300 may include PE router 206 in communication with iBGP peer 202 and eBGP peers 310(1), 310(2), and 310(3). In one example, PE router 206 may reside between iBGP peer 202 and eBGP peers 310(1)-(3). In this example, PE router 206 and eBGP peers 310(1)-(3) may represent portions of a provider network and/or the provider side of a network. Additionally or alternatively, iBGP peer 202 may represent a portion of a customer network and/or the customer side of a network.

As illustrated in FIG. 3, system 300 may also include a VRF 314 that represents portions of PE router 206 and/or iBGP peer 202. For example, VRF 314 may be implemented across PE router 206 and iBGP peer 202. Alternatively, VRF 314 may be implemented exclusively on PE router 206. In addition, PE router 206 may include and/or implement multiple VRF instances (although not explicitly illustrated in FIG. 3).

In one example, VRF 314 may represent a virtual routing instance that is hosted by PE router 206 alongside a main routing instance that is implemented by PE router 206. In other words, PE router 206 may provide and/or maintain both VRF 314 and another routing instance.

eBGP peers 310(1)-(3) each generally represent any type or form of physical computing device that supports BGP and facilitates communication within a network. In one example, eBGP peers 310(1)-(3) may include and/or represent a router (such as a hub router, a spoke router, an autonomous system boundary router, and/or an area border router). Additional examples of eBGP peers 310(1)-(3) include, without limitation, switches, hubs, modems, bridges, repeaters, gateways, multiplexers, network adapters, network interfaces, servers, portions of one or more of the same, combinations or variations of one or more of the same, and/or any other suitable eBGP peers.

Figure 4:
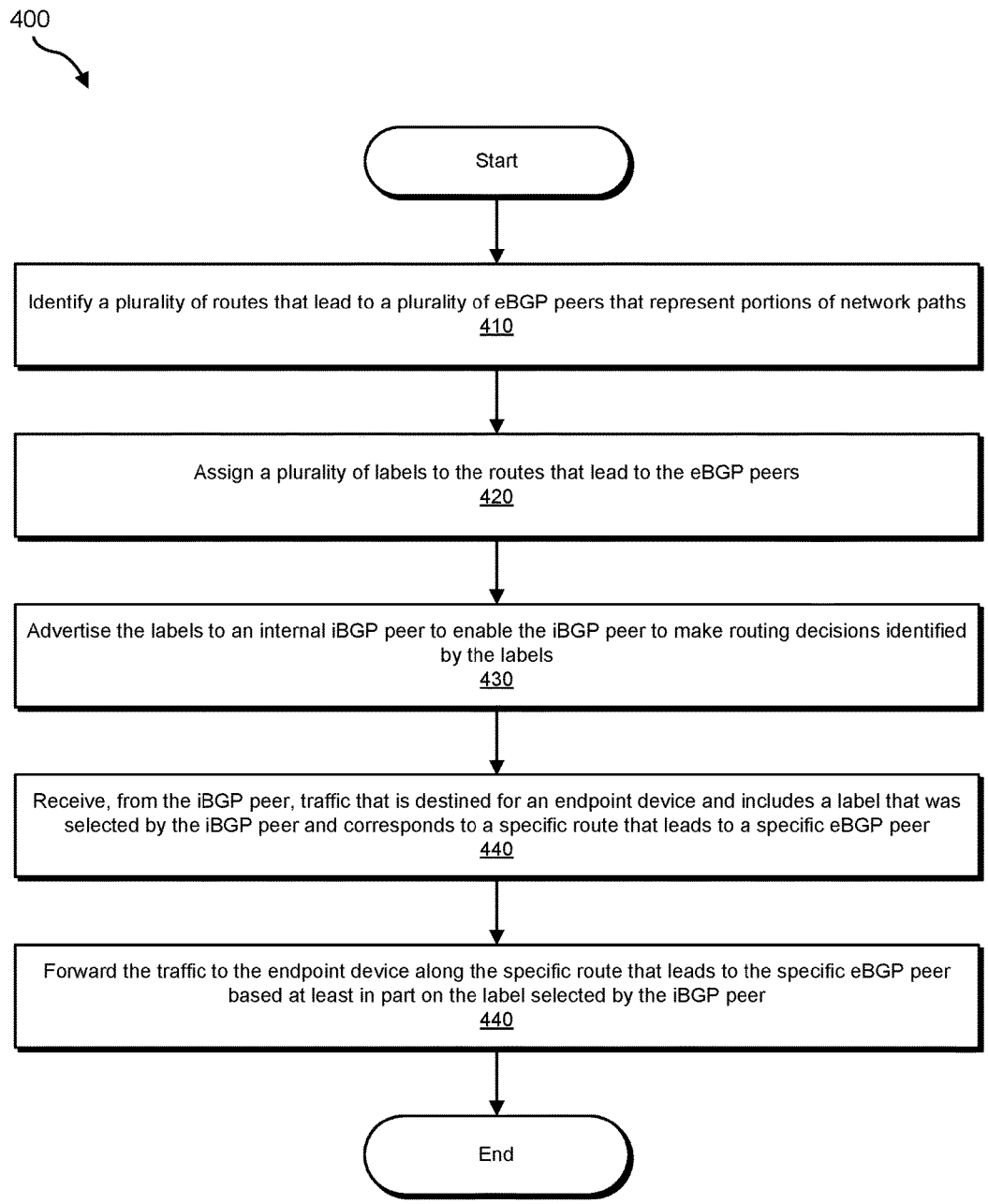
FIG. 4 is a flow diagram of an exemplary method for facilitating label-identified routing decisions by iBGP peers.

FIG. 4 is a flow diagram of an example computer-implemented method 400 for facilitating label-identified routing decisions by iBGP peers. The steps shown in FIG. 4 may be performed by any suitable computer-executable code and/or computing system, including system 100 in FIG. 1, system 200 in FIG. 2, system 300 in FIG. 3, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 410 one or more of the systems described herein may identify a plurality of routes that lead to a plurality of eBGP peers that represent portions of network paths. For example, route module 104 may, as part of PE router 206 in FIG. 2 or 3, identify routes 120 that lead to eBGP peers 310(1)-(3). In this example, routes 120 may include and/or represent ARP routes that associate IP addresses of eBGP peers 310(1)-(3) with MAC addresses of eBGP peers 310(1)-(3).

The systems described herein may perform step 410 in a variety of different ways and/or contexts. In some examples, route module 104 may identify and/or obtain the IP addresses and/or the MAC addresses of eBGP peers 310(1)-(3). In such examples, route module 104 may generate ARP routes that correspond and/or lead to eBGP peers based at least in part on their IP and MAC addresses.

Returning to FIG. 4, at step 420 one or more of the systems described herein may assign a plurality of labels to the routes that lead to the eBGP peers. For example, assignment module 106 may, as part of PE router 206 in FIG. 2 or 3, assign labels 122 to routes 120 such that each route has a corresponding label. In this example, labels 122 may include and/or represent MPLS labels that indicate and/or represent at least a portion of a particular network path. In other words, each of labels 122 may correspond to a next hop relative to a particular network device.

The systems described herein may perform step 420 in a variety of different ways and/or contexts. In some examples, assignment module 106 may associate each of labels 122 with a route and/or next hop such that each label points to a particular portion of a network path. In one example, route module 104 may populate a routing table of VRF 314 in FIG. 3 with the ARP routes and the labels assigned to the ARP routes. In addition, route module 104 may populate another routing table outside of VRF 314 at PE router 206 with the ARP routes and the labels assigned to the ARP routes.

Returning to FIG. 4, at step 430 one or more of the systems described herein may advertise the labels to an iBGP peer to enable the iBGP peer to make routing decisions identified by the labels. For example, advertising module 108 may, as part of PE router 206 in FIG. 2 or 3, advertise labels 122 to iBGP 202. By advertising labels 122 to iBGP 202 in this way, advertising module 108 may enable iBGP peer 202 to make upstream routing decisions identified by labels 122.

The systems described herein may perform step 430 in a variety of different ways and/or contexts. In some examples, advertising module 108 may leak the ARP routes and/or labels from PE router to iBGP peer 202 via the routing table of VRF 314. In one example, advertising module 108 may leak the ARP routes and/or labels as one or more Routing Information Base (RIB) groups.

As a specific example, route module 104 may extend the Egress Peer Engineering (EPE) functionality on PE router 202. In this example, route module 104 may populate a routing table of a main routing instance on PE router 206 with the ARP routes and/or labels. In this example, route module 104 and/or advertising module 108 may leak the ARP routes and/or labels as one or more RIB groups from the main routing instance's table to the routing table of VRF 314 by enabling the "egress-te" feature. Once the RIB groups have finished leaking to the routing table of VRF 314, advertising module 108 may advertise the ARP routes and/or labels to iBGP peer 202 by way of VRF 314.

Returning to FIG. 4, at step 440 one or more of the systems described herein may receive, from the iBGP peer, traffic that is destined for an endpoint device and includes a label that was selected by the iBGP peer and corresponds to a specific route that leads to a specific eBGP peer. For example, receiving module 110 may, as part of PE router 206 in FIG. 2 or 3, receive traffic from iBGP peer 202. In this example, the traffic may be destined for an endpoint device (not necessarily illustrated in FIG. 2 or 3) and/or include a label that was selected by iBGP peer 202 and corresponds to the route that leads to eBGP peer 310(1).

The systems described herein may perform step 440 in a variety of different ways and/or contexts. In some examples, receiving module 110 may monitor PE router 206 for incoming packets. In one example, while monitoring PE router 206 in this way, receiving module 110 may detect, receive, and/or identify packets arriving from iBGP peer 202. For example, route module 104 may, as part of iBGP peer 202 in FIG. 2, select eBGP peer 310(1) to handle a certain packet. In this example, route module 104 and/or forwarding module 112 may apply, attach, and/or insert a label to the packet (in, e.g., a header). This label may correspond to the route that leads to eBGP peer 310(1). Forwarding module 112 may then forward the packet with the label from iBGP peer 202 to PE router 206.

As the packet arrives at PE router 206, route module 104 may swap the label applied to the packet. For example, route module 104 may pop the existing label from the packet. In this example, route module 104 may then perform an MPLS label lookup to identify the next label to apply to the packet. Accordingly, route module 104 may be able to identify the next label without performing an IP lookup at PE router 206. Route module 104 and/or forwarding module 112 may then apply, attach, and/or insert the next label to the packet (in, e.g., the header). This next label may correspond to the next hop after eBGP peer 310(1) on the way to the packet's final destination.

In some examples, PE router 206 may enable iBGP peer 202 to access and/or view information that identifies the amounts of traffic flowing to eBGP peers 310(1)-(3) from PE router 206. By accessing and/or viewing such information, iBGP peer 202 may be able to determine the utilization levels of the links connecting PE router to each of eBGP peers 310(1)-(3) and then select a particular eBGP peer to handle outgoing traffic based at least in part on the link utilization levels. For example, iBGP peer 202 may determine, based at least in part on such information, that eBGP peer 310(1) is the least utilized of all eBGP peers 310(1)-(3) and/or that the link between PE router 206 and eBGP peer 310(1) is the least utilized of all the links leading to eBGP peers 310(1)-(3) from PE router 206. In this example, route module 104 may select eBGP peer 310(1) to handle the traffic due at least in part to eBGP peer 310(1) being the least utilized of all eBGP peers 310(1)-(3) and/or the link between PE router 206 and eBGP peer 310(1) being the least utilized of all the links leading to eBGP peers 310(1)-(3) from PE router 206. Accordingly, iBGP peer 202 may be able to make upstream routing decisions based on such utilizations levels.

As illustrated in FIG. 4, at step 450 one or more of the systems described herein may forward the traffic to the endpoint device along the specific route that leads to the specific eBGP peer based at least in part on the label selected by the iBGP peer. For example, forwarding module 112 may, as part of PE router 206, forward the traffic to the endpoint device along the specific route that leads to eBGP peer 310(1) based at least in part on the label selected by iBGP peer 310(1). In other words, forwarding module 112 may forward the traffic to eBGP peer 310(1) on the way to its final destination.

The systems described herein may perform step 450 in a variety of different ways and/or contexts. In some examples, forwarding module 112 may forward the packet with the swapped label from PE router 206 to eBGP peer 310(1) such that eBGP peer 310(1) is able to forward the packet to the next hop identified by the swapped label.

Figure 5:
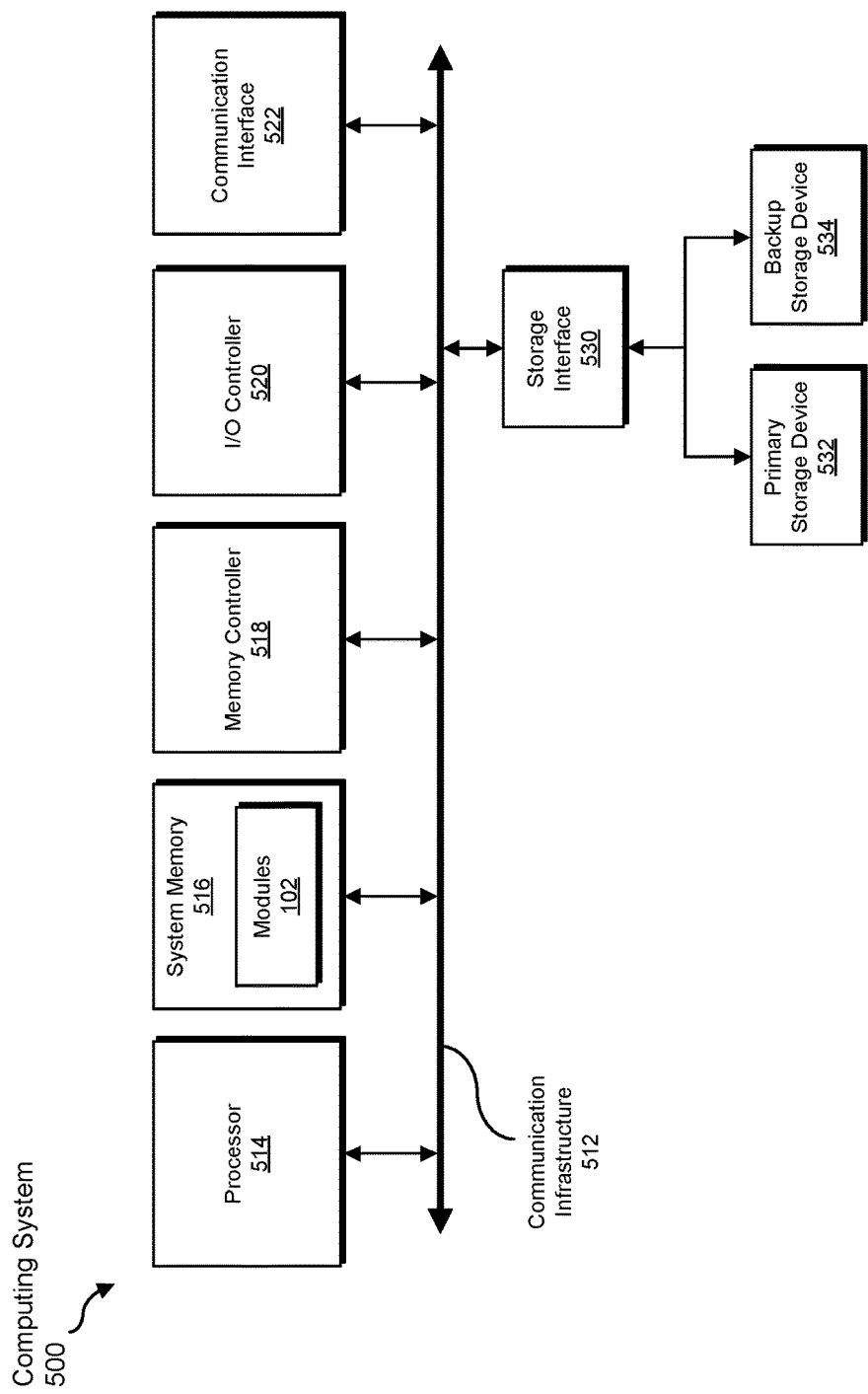
FIG. 5 is a block diagram of an exemplary computing system capable of implementing and/or being used in connection with one or more of the embodiments described and/or illustrated herein.

FIG. 5 is a block diagram of an exemplary computing system 500 capable of implementing and/or being used in connection with one or more of the embodiments described and/or illustrated herein. In some embodiments, all or a portion of computing system 500 may perform and/or be a means for performing, either alone or in combination with other elements, one or more of the steps described in connection with FIG. 3. All or a portion of computing system 500 may also perform and/or be a means for performing and/or implementing any other steps, methods, or processes described and/or illustrated herein. In one example, computing system 500 may include and/or store all or a portion of modules 102 from FIG. 1.

Computing system 500 broadly represents any type or form of electrical load, including a single or multi-processor computing device or system capable of executing computer-readable instructions. Examples of computing system 500 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 500 may be programmed, configured, and/or otherwise designed to comply with one or more networking protocols. According to certain embodiments, computing system 500 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 500 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 500 may include various network and/or computing components. For example, computing system 500 may include at least one processor 514 and a system memory 516. Processor 514 generally represents any type or form of processing unit capable of processing data or interpreting and executing instructions. For example, processor 514 may represent an application-specific integrated circuit (ASIC), a system on a chip (e.g., a network processor), a hardware accelerator, a general purpose processor, and/or any other suitable processing element.

Processor 514 may process data according to one or more of the networking protocols discussed above. For example, processor 514 may execute or implement a portion of a protocol stack, may process packets, may perform memory operations (e.g., queuing packets for later processing), may execute end-user applications, and/or may perform any other processing tasks.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 500 may include both a volatile memory unit (such as, for example, system memory 516) and a non-volatile storage device (such as, for example, primary storage device 532, as described in detail below). System memory 516 may be implemented as shared memory and/or distributed memory in a network device. Furthermore, system memory 516 may store packets and/or other information used in networking operations.

In certain embodiments, exemplary computing system 500 may also include one or more components or elements in addition to processor 514 and system memory 516. For example, as illustrated in FIG. 5, computing system 500 may include a memory controller 518, an Input/Output (I/O) controller 520, and a communication interface 522, each of which may be interconnected via communication infrastructure 512. Communication infrastructure 512 generally represents any type or form of infrastructure capable of facilitating communication between one or more components of a computing device. Examples of communication infrastructure 512 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 518 generally represents any type or form of device capable of handling memory or data or controlling communication between one or more components of computing system 500. For example, in certain embodiments memory controller 518 may control communication between processor 514, system memory 516, and I/O controller 520 via communication infrastructure 512. In some embodiments, memory controller 518 may include a Direct Memory Access (DMA) unit that may transfer data (e.g., packets) to or from a link adapter.

I/O controller 520 generally represents any type or form of device or module capable of coordinating and/or controlling the input and output functions of a computing device. For example, in certain embodiments I/O controller 520 may control or facilitate transfer of data between one or more elements of computing system 500, such as processor 514, system memory 516, communication interface 522, and storage interface 530.

Communication interface 522 broadly represents any type or form of communication device or adapter capable of facilitating communication between exemplary computing system 500 and one or more additional devices. For example, in certain embodiments communication interface 522 may facilitate communication between computing system 500 and a private or public network including additional computing systems. Examples of communication interface 522 include, without limitation, a link adapter, a wired network interface (such as a network interface card), a wireless network interface (such as a wireless network interface card), and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 522 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also enable computing system 500 to engage in distributed or remote computing. For example, communication interface 522 may receive instructions from a remote device or send instructions to a remote device for execution.

As illustrated in FIG. 5, exemplary computing system 500 may also include a primary storage device 532 and/or a backup storage device 534 coupled to communication infrastructure 512 via a storage interface 530. Storage devices 532 and 534 generally represent any type or form of storage device or medium capable of storing data and/or other computer-readable instructions. For example, storage devices 532 and 534 may represent a magnetic disk drive (e.g., a so-called hard drive), a solid state drive, a floppy disk drive, a magnetic tape drive, an optical disk drive, a flash drive, or the like. Storage interface 530 generally represents any type or form of interface or device for transferring data between storage devices 532 and 534 and other components of computing system 500.

In certain embodiments, storage devices 532 and 534 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 534 may also include other similar structures or devices for allowing computer software, data, or other computer-readable instructions to be loaded into computing system 500. For example, storage devices 532 and 534 may be configured to read and write software, data, or other computer-readable information. Storage devices 532 and 534 may be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from those shown in FIG. 5. Computing system 500 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    identifying a plurality of Internet Protocol (IP) addresses of a plurality of external Border Gateway Protocol (eBGP) peers that represent portions of network paths;
    generating, at a Provider Edge (PE) router that resides between an internal Border Gateway Protocol (iBGP) peer and the eBGP peers, a plurality of Address Resolution Protocol (ARP) routes that:
        lead to the eBGP peers; and
        associate the IP addresses of the eBGP peers with corresponding Media Access Control (MAC) addresses of the eBGP peers;
    assigning a plurality of labels to the ARP routes that lead to the eBGP peers;
    advertising the labels to the iBGP peer to enable the iBGP peer to make routing decisions identified by the labels;
    receiving, from the iBGP peer, traffic that is destined for an endpoint device and includes a label that:
        was selected by the iBGP peer; and
        corresponds to a specific ARP route that leads to a specific eBGP peer; and
    forwarding the traffic to the endpoint device along the specific ARP route that leads to the specific eBGP peer based at least in part on the label selected by the iBGP peer.

2. The method of claim 1, further comprising populating a Virtual Routing and Forwarding (VRF) routing table at the PE router with the ARP routes and the labels assigned to the ARP routes.

3. The method of claim 2, wherein advertising the labels to the iBGP peer comprises leaking the ARP routes and labels from the PE router to the iBGP peer as a Routing Information Base (RIB) group via the VRF routing table.

4. The method of claim 1, further comprising:
    selecting, at the iBGP peer, the specific eBGP peer to handle the traffic;
    applying, to the traffic, the label corresponding to the specific route that leads to the specific eBGP peer; and
    forwarding the traffic with the label to the PE router such that the PE router is able to forward the traffic to the specific eBGP peer based at least in part on the label.

5. The method of claim 4, wherein forwarding the traffic to the specific eBGP peer comprises forwarding the traffic from the PE router to the specific eBGP peer without performing an IP lookup at the PE router.

6. The method of claim 5, wherein forwarding the traffic from the PE router to the specific eBGP peer comprises:
    performing a label lookup at the PE router to identify a subsequent label that corresponds to a subsequent route;
    applying, to the traffic, the subsequent label that corresponds to the subsequent route; and
    forwarding the traffic to the specific eBGP peer with the subsequent label such that the eBGP peer is able to forward the traffic along the subsequent route.

7. The method of claim 1, wherein the labels assigned to the ARP routes comprise MultiProtocol Label Switching (MPLS) labels.

8. The method of claim 1, further comprising enabling the iBGP peer to access information that identifies amounts of traffic that are flowing to the eBGP peers.

9. The method of claim 8, further comprising selecting, at the iBGP peer, the specific eBGP peer to handle the traffic based at least in part on the amounts of traffic that are flowing to the eBGP peers.

10. The method of claim 9, wherein selecting the eBGP peer to handle the traffic comprises:
determining, based at least in part on the amounts of traffic flowing to the eBGP peers, that the eBGP peer is the least utilized of all of the eBGP peers; and
selecting the eBGP peer to handle the traffic due at least in part to the eBGP peer being the least utilized of all of the eBGP peers.

11. A system comprising:
a route module, stored in non-transitory memory, that:
identifies a plurality of Internet Protocol (IP) addresses of a plurality of external Border Gateway Protocol (eBGP) peers that represent portions of network paths;
generates, at a Provider Edge (PE) router that resides between an internal Border Gateway Protocol (iBGP) peer and the eBGP peers, a plurality of Address Resolution Protocol (ARP) routes that:
lead to the eBGP peers; and
associate the IP addresses of the eBGP peers with corresponding Media Access Control (MAC) addresses of the eBGP peers;
an assignment module, stored in non-transitory memory, that assigns a plurality of labels to the ARP routes that lead to the eBGP peers;
an advertising module, stored in non-transitory memory, that advertises the labels to the iBGP peer to enable the iBGP peer to make routing decisions identified by the labels;
a receiving module, stored in non-transitory memory, that receives, from the iBGP peer, traffic that is destined for an endpoint device and includes a label that:
was selected by the iBGP peer; and
corresponds to a specific ARP route that leads to a specific eBGP peer;
a forwarding module, stored in non-transitory memory, that forwards the traffic to the endpoint device along the specific ARP route that leads to the specific eBGP peer based at least in part on the label selected by the iBGP peer; and
at least one physical processor that executes the route module, the assignment module, the advertising module, the receiving module, and the forwarding module.

12. The system of claim 11, wherein the route module populates a Virtual Routing and Forwarding (VRF) routing table at the PE router with the ARP routes and the labels assigned to the ARP routes.

13. The system of claim 12, wherein the advertising module leaks the ARP routes and labels from the PE router to the iBGP peer as a Routing Information Base (RIB) group via the VRF routing table.

14. The system of claim 11, wherein:
the route module selects, at the iBGP peer, the specific eBGP peer to handle the traffic; and
the forwarding module:
applies, to the traffic, the label corresponding to the specific route that leads to the specific eBGP peer; and
forwards the traffic with the label to the PE router such that the PE router is able to forward the traffic to the specific eBGP peer based at least in part on the label.

15. The system of claim 14, wherein the forwarding module forwards the traffic from the PE router to the specific eBGP peer without performing an IP lookup at the PE router.

16. The system of claim 15, wherein the forwarding module:
performs a label lookup at the PE router to identify a subsequent label that corresponds to a subsequent route;
applies, to the traffic, the subsequent label that corresponds to the subsequent route; and
forwards the traffic to the specific eBGP peer with the subsequent label such that the eBGP peer is able to forward the traffic along the subsequent route.

17. The system of claim 16, wherein the labels assigned to the ARP routes comprise MultiProtocol Label Switching (MPLS) labels.

18. An apparatus comprising:
at least one non-transitory storage device that stores a plurality of Address Resolution Protocol (ARP) routes that:
were generated at a Provider Edge (PE) router that resides between an internal Border Gateway Protocol (iBGP) peer and a plurality of external Border Gateway Protocol (eBGP) peers that represent portions of network paths;
lead to the eBGP peers; and
associate a plurality of Internet Protocol (IP) addresses of the eBGP peers with corresponding Media Access Control (MAC) addresses of the eBGP peers; and
at least one physical processing device communicatively coupled to the storage device, wherein the physical processing device:
assigns a plurality of labels to the ARP routes that lead to the eBGP peers;
advertises the labels to the iBGP peer to enable the iBGP peer to make routing decisions identified by the labels;
receives, from the iBGP peer, traffic that is destined for an endpoint device and includes a label that:
was selected by the iBGP peer; and
corresponds to a specific ARP route that leads to a specific eBGP peer; and
forwards the traffic to the endpoint device along the specific ARP route that leads to the specific eBGP peer based at least in part on the label selected by the iBGP peer.

* * * * *